(12) United States Patent
Waite et al.

(10) Patent No.: US 11,429,356 B2
(45) Date of Patent: Aug. 30, 2022

(54) COMPOSITION ENABLEMENT FOR PARTNER AND CUSTOMER EXTENSIBILITY OF INVERSION OF CONTROL OBJECTS

(71) Applicant: Toshiba Global Commerce Solutions Holdings Corporation, Tokyo (JP)

(72) Inventors: Jonathan Waite, Cary, NC (US); Zachary M. Darden, New Hill, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 51 days.

(21) Appl. No.: 16/750,333

(22) Filed: Jan. 23, 2020

(65) Prior Publication Data
US 2021/0232371 A1 Jul. 29, 2021

(51) Int. Cl.
*G06F 9/44* (2018.01)
*G06F 8/36* (2018.01)

(52) U.S. Cl.
CPC .................... *G06F 8/36* (2013.01)

(58) Field of Classification Search
None
See application file for complete search history.

(56) References Cited

U.S. PATENT DOCUMENTS

| | | | |
|---|---|---|---|
| 9,164,740 B2 | 10/2015 | Hargett, Jr. et al. | |
| 2003/0065986 A1* | 4/2003 | Fraenkel | G06F 11/3089 714/47.2 |
| 2004/0133620 A1* | 7/2004 | Habetha | H04L 45/04 709/200 |
| 2004/0177360 A1* | 9/2004 | Beisiegel | G06F 8/30 719/316 |
| 2005/0262475 A1* | 11/2005 | Halpern | G06F 8/71 717/114 |
| 2009/0267937 A1* | 10/2009 | Finn | G06T 13/20 345/419 |
| 2011/0035405 A1* | 2/2011 | Kiraly | G06F 16/2458 707/769 |
| 2014/0344779 A1* | 11/2014 | Hargett, Jr | G06F 8/36 717/107 |
| 2018/0084075 A1* | 3/2018 | Ron | H04L 67/02 |

* cited by examiner

*Primary Examiner* — Anna C Deng
(74) *Attorney, Agent, or Firm* — Patterson & Sheridan, LLP

(57) ABSTRACT

The present disclosure provides techniques for composition enablement for extensibility of a system. The techniques include delivering an interface to a first downstream provider, where the interface includes a bean implementation format. Then performing at least one of: (i) receiving a provider level (POL) selection from the first downstream provider, where the POL selection corresponds to a POL stored in an extender, and delivering a first bean implementation to the first downstream provider based on the POL, and (ii) receiving a constructed bean implementation from the downstream provider, determining a POL of the downstream provider, and storing the constructed bean implementation in the extender at the determined POL.

16 Claims, 5 Drawing Sheets

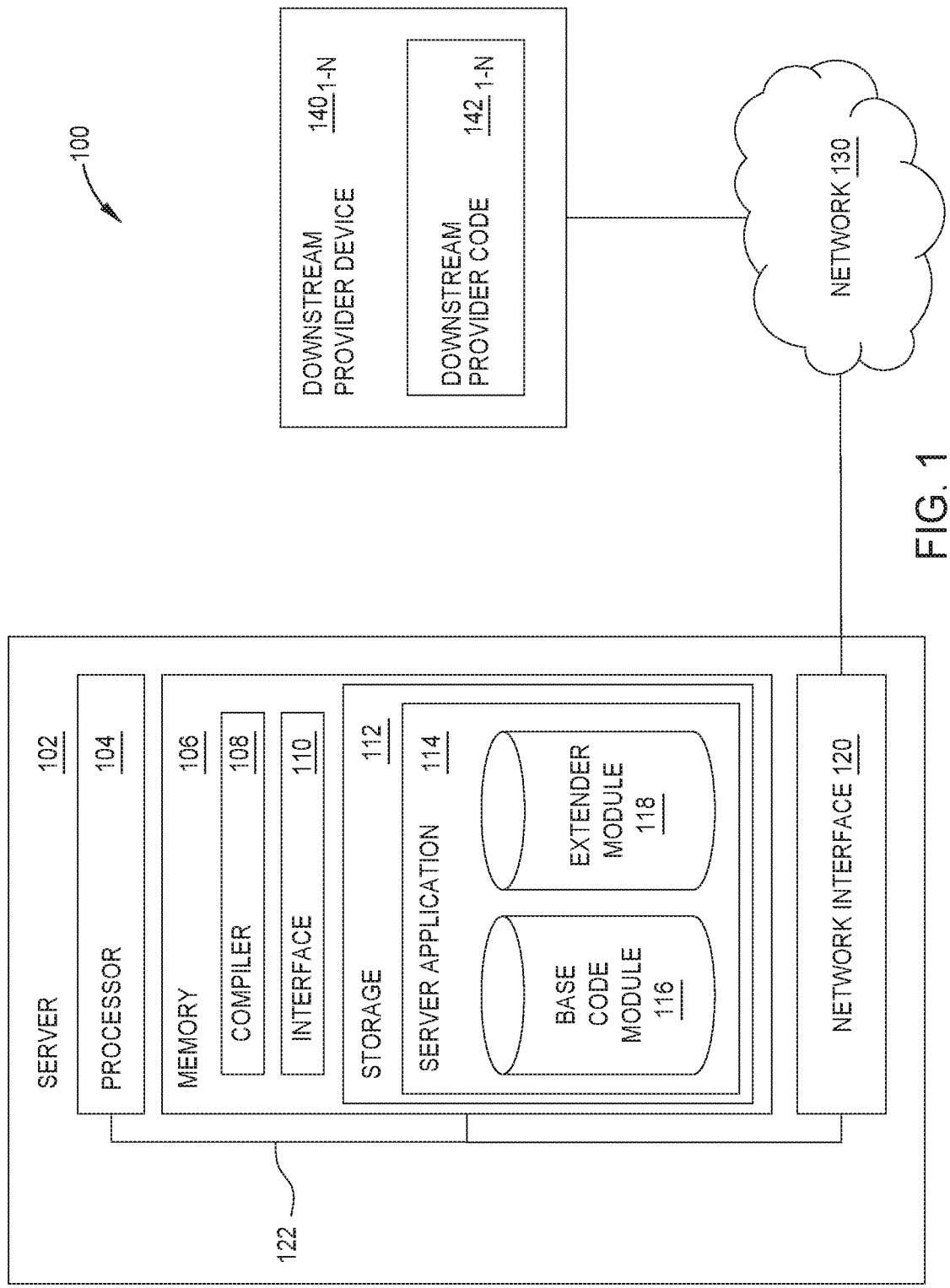

COMPOSITION ENABLEMENT FOR PARTNER AND CUSTOMER EXTENSIBILITY OF INVERSION OF CONTROL OBJECTS

BACKGROUND

The present invention relates to microservice software, and more specifically, to extending the functionality of a framework to support microservice software. Microservice software is decomposed, modularly structured business services software where base code of the software is developed by a first party. Each module of the software may be developed by other parties, independent of the first party, to extend the functionality of the software to provide improved business service functionality.

A framework is a code set that streamlines coding by offering reusable, preset patterns of code that provide outlines for accomplishing common programming tasks. A developer adds code to the preset patterns of code provided by the framework in order to complete a programming task. Using a framework can standardize the structure of an application, allowing for easier code interpretation and extensibility.

SUMMARY

According to one embodiment of the present invention, a method is provided. The method comprises delivering an interface to a first downstream provider, where the interface includes a bean implementation format, and performing at least one of: (i) receiving a provider level (POL) selection from the first downstream provider, where the POL selection corresponds to a POL stored in an extender, and delivering a first bean implementation to the first downstream provider based on the POL, and (ii) receiving a constructed bean implementation from the downstream provider, determining a POL of the downstream provider, and storing the constructed bean implementation in the extender at the determined POL.

According to another embodiment of the present invention, a computer program product comprising a non-transitory computer-readable storage medium having computer-readable program code embodied therewith, where the computer-readable program code is executable by one or more computer processors, is provided. The computer-readable program code is configured to deliver an interface to a first downstream provider, where the interface includes a bean implementation format, and perform at least one of the following: (i) receive a provider level (POL) selection from the first downstream provider, where the POL selection corresponds to a POL stored in an extender, and deliver a first bean implementation to the first downstream provider based on the POL, and (ii) receive a constructed bean implementation from the downstream provider, determine a POL of the downstream provider, and store the constructed bean implementation in the extender at the determined POL.

According to another embodiment of the present invention, a method is provided. The method comprises receiving an interface comprising a bean implementation format, and performing at least one of: (i) constructing a first bean implementation, and delivering the first bean implementation to an extender, and (ii) selecting a provider level (POL) for a second bean implementation, and delivering the POL selection to an extender.

BRIEF DESCRIPTION OF THE SEVERAL VIEWS OF THE DRAWINGS

FIG. 1 illustrates a computing environment including an extendable microservice application, according to one embodiment.

DETAILED DESCRIPTION

Figure 2A:
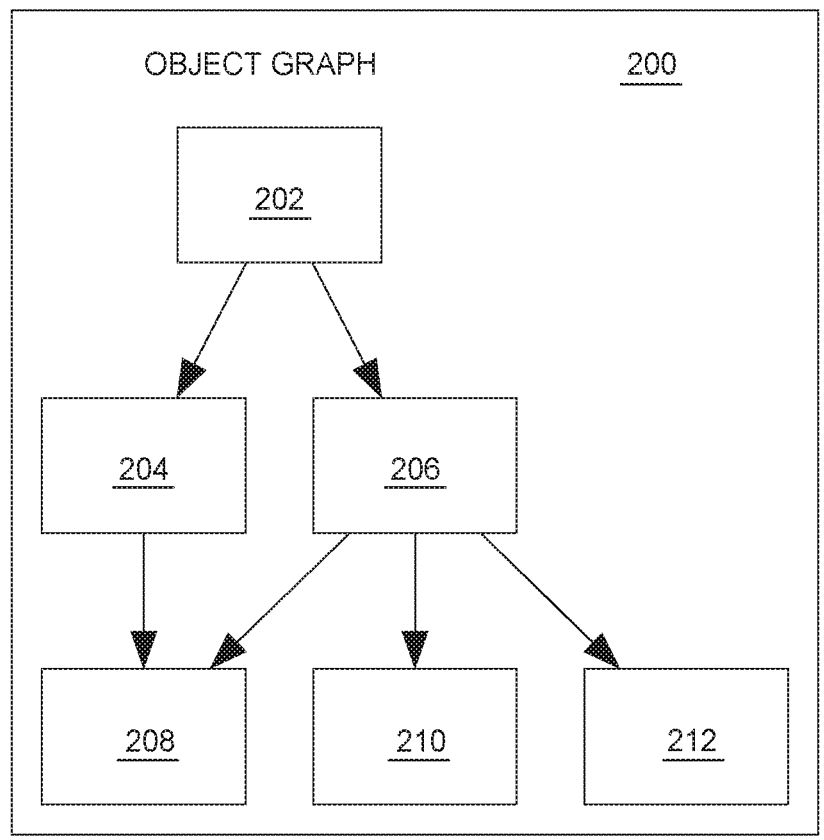
FIG. 2A illustrates an object graph, according to one embodiment.

So that features of the present disclosure can be understood in detail, embodiments of the present invention disclosed herein may reference Spring framework (Spring), and features thereof, as software tools to perform functionality described herein. However, the functionality of the present disclosure is not limited to using Spring framework, Spring beans, or any other framework or accompanying features, and may instead be implemented by any framework or code implementing dependency injection or the concept of Inversion of Control.

A base provider is a party that develops the base code of a microservice software. A downstream provider is a party that develops a module or portion of the software independent from the base provider or other downstream providers. Currently available microservice software does not allow a present downstream provider to substitute objects from a base provider or previous downstream providers with same-type objects selected from among the previous providers.

In some embodiments, functionality of a framework is extended such that an object from a base provider, and objects of the same type from a first downstream provider, can be selected for implementation by a second downstream provider.

FIG. 1 illustrates a computing environment including an extendable microservice application, according to one embodiment. In one embodiment, the computing environment 100 can include one or more virtual devices and/or physical devices, which can be arranged in a cloud environment, in a distributed network, or the like. In another embodiment, the computing environment includes a single computer.

In yet another embodiment, the computing environment 100 includes a server 102 that is communicatively coupled to one or more other downstream provider devices $140_{1-N}$ via a network 130. Although not included in the illustrated embodiment, each of the downstream provider devices $140_{1-N}$ may generally include processors, memory, storage, network interfaces, input/output (I/O) devices, and the like. The network 130 may include, for example, a telecommunications network, a local or wide area network, the Internet, and the like.

In the illustrated embodiment, the server 102 includes a processor 104, memory 106, storage 112, a network interface 120, and one or more I/O devices (not shown), communicatively coupled by one or more buses 122. The server 102 is generally controlled by an operating system (not shown).

The processor 104 is a programmable logic device that can perform instruction, logic, and mathematical processing. The processor 104 may retrieve and execute programming instructions stored in memory 106, or store and retrieve application data residing in storage 112. The processor 104 is generally representative of a single CPU or GPU, multiple CPUs or GPUs, a single CPU or GPU having multiple processing cores, and the like.

The memory 106 may be representative of a random access memory. The storage 112 may be representative of hard-disk drives, solid state drives, flash memory devices, optical media and the like. The storage 112 can include fixed or removable storage devices, such as fixed disk drives, removable memory cards, caches, optical storage, network attached storage (NAS), or storage area networks (SAN). The memory 106 and the storage 112 can also include memory or storage physically located away from the server 102. For example, the memory 106 or storage 112 may be located on another computer coupled to server 102 via the bus 122, or the network 130.

The network interface 120 can include any type of network communications interface allowing the server 102 to communicate with other computers or devices via the network 130. Although not included in the illustrated embodiment, the system can further include one or more input devices, which can include any device for providing input to the server 102. For example, the input device may include keyboards, mice, controllers, buttons, switches, or other physical device mechanisms for controlling the server 102. Output devices (not shown) may include output devices such as monitors, touch screen displays, and the like.

The memory 106 includes a compiler 108, and an interface 110. Additionally, the storage 112 includes a server application 114 comprising a base code module 116 and an extender module 118. The base code module 116 includes code for the interface 110, which can be loaded into memory 106. The base code module 116 and the extender module 118 are made available to one or more downstream provider devices $140_{1\text{-}N}$.

The interface 110 defines one or more formats or parameters for objects that are compatible with storage in the extender module 118. The interface 110 is made available to one or more downstream provider devices $140_{1\text{-}N}$.

Generally, a downstream provider uses a downstream provider device $140_{1\text{-}N}$ to develop downstream provider code $142_{1\text{-}N}$. The downstream provider code $142_{1\text{-}N}$ is software that generates or implements objects adhering to the parameters and formats defined in the interface 110. The downstream provider can create unique objects in its code, or can implement objects from the base code module 116 or the extender module 118 in lieu of creating objects unique to the downstream provider.

In some embodiments, the downstream provider code $142_{1\text{-}N}$ is delivered to the server 120 and stored in the extender module 118. The extender module 118 can store the downstream provider code $142_{1\text{-}N}$ from each downstream provider at a respective provider level (POL). Downstream provider code $142_{1\text{-}N}$ from multiple downstream providers can be stored at the same POL. Objects provided in the base code module 116 can be referenced by a POL. A downstream provider who wishes to implement objects from the base provider or another downstream provider can select a POL to implement objects from that POL, in lieu of hard-coding objects received from the base code module 116 or extender module 118.

For example, the extender module 118 can reference objects from the base code module 116 as POL 0. Downstream provider code $142_1$ from Provider 1 may be stored in the extender module 118 at POL 1, while downstream provider code $142_N$ from Provider N may be stored in the extender module 118 at POL N. Provider X can select POL 1 to implement objects from Provider 1.

FIG. 2A illustrates an object graph, according to one embodiment. In object-oriented programming, when a first class references a second class, an object instantiated from the second class is a dependency of the first class. Hence, when objects are instantiated based on the classes, each of these objects is a dependency of any class that implements the object.

As used herein, an object graph depicts a snapshot of a network of objects showing the objects' dependency relationships. As illustrated, object graph 200 depicts dependency relationships between objects 202, 204, 206, 208, 210, and 212. Object 202 is directly dependent on objects 204 and 206; hence, objects 204 and 206 are dependencies of object 202. Thus, the class that generates object 202 references, in its class definition, the classes that generate object 204 and object 208. Object 204 is dependent on object 208; hence, object 208 is a dependency of objects 202 and 204. Thus, the class that generates object 204 references, in its class definition, the class that generates object 208. Object 206 is dependent on objects 210 and 212; hence, objects 210 and 212 are dependencies of objects 202 and 206. Thus, the class that generates object 206 references, in its class definition, the classes that generate object 210 and object 212.

The dependency relationships in the object graph 200 indicate that the objects are tightly coupled to the classes from which objects were instantiated. For example, object 202 is tightly coupled to the classes that generate objects 204, 206, 208, 210, and 212. Tight coupling refers to a group of classes that are directly dependent, or otherwise highly dependent, on one another.

Tight coupling is not ideal in settings where additional functionality for the objects may be added independently from the initial software application release, because such additional functionality may require changing the code to all the objects involved in the additional functionality.

For example, in a business services setting, objects may be used for purposes such as storing data (data objects) or providing functionality (function objects). Data objects may include, for example, customer account information or purchase records. Function objects may contain methods to fetch or manipulate data from the data objects, such as retrieving a customer's account number or setting a data object property to reflect the number of customer purchases for a fiscal quarter. If the functionality of a function object that fetches a customer's account number from a data object is extended to include the customer's name, then each data object containing a customer's account number may need to be modified to include the customer's name.

Figure 2B:
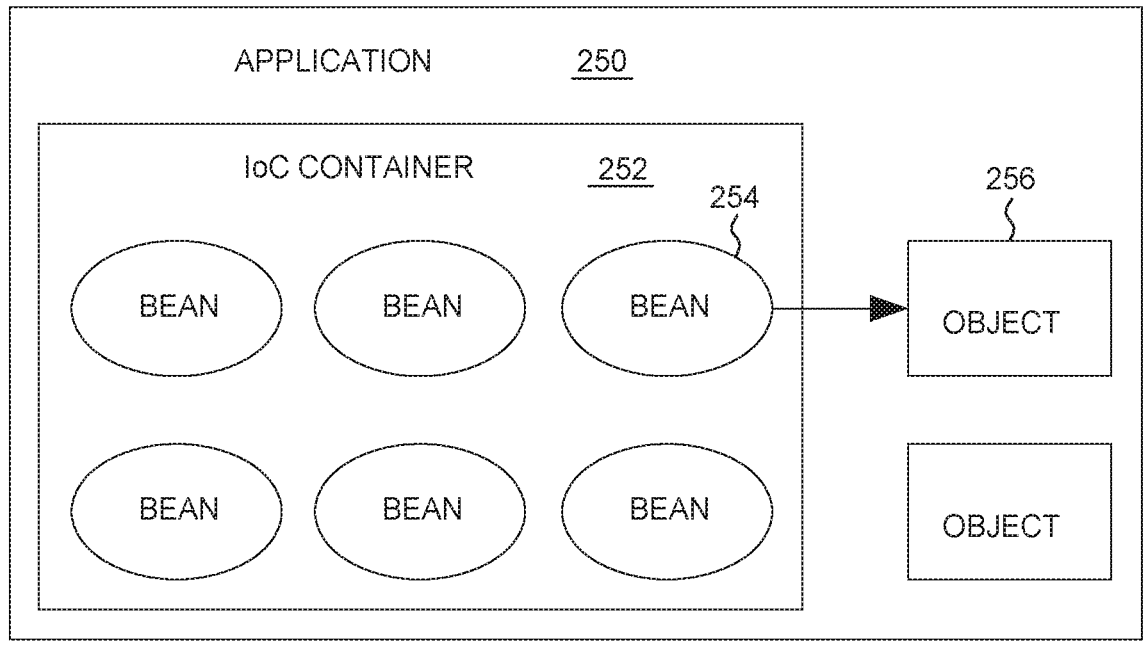
FIG. 2B illustrates objects within an application and inversion of control container, according to one embodiment.

FIG. 2B illustrates objects within an application and inversion of control, according to one embodiment. Inversion of control (IoC) refers to the concept of that code should depend on abstractions, such that dependencies may be substituted for one another so long as they fit the respective abstraction format.

A framework implementing IoC (referred to herein as an IoC framework), can create different types of IoC containers 252. As used herein, objects included in the IoC container 252 are referred to as beans. The IoC framework can manage the complete life cycle of the beans. For example, an IoC framework can create beans, dynamically connect (wire) beans to one another, or dispose of beans, based on instructions received from configuration metadata. The configuration metadata may be found, for example, in the source code or in an XML file.

The use of beans allows for the decoupling of objects. For example, in a scenario not implementing beans such as in the embodiment illustrated in FIG. 2A, object 202 and object 204 are tightly coupled. Hence, the class used to generate object 204 may be hard coded into the class used to generate object 202. In contrast, in a scenario implementing beans, such as in the embodiment illustrated in FIG. 2B, the IoC framework can generate bean 254 in the IoC container 252, and dynamically make a reference between bean 254 and object 256. Hence, bean 254 and object 256 become loosely coupled.

The IoC framework can implement dependency injection (DI) to ensure that each class dynamically references all of its bean dependencies. DI is an implementation of IoC whereby decoupled bean dependencies are wired to their dependent class, as opposed to being hard-coded into the class. The IoC framework is able to dynamically manage the dependency connections for the decoupled beans. One advantage of DI is that it allows for easier extension of bean functionality by downstream providers since each bean does not require modification to accommodate the extended functionality, and substituting a bean only requires an update in the IoC container 252.

Returning to the aforementioned business services example, if the functionality of a function object that fetches a customer's account number is extended to include the customer's name, then each data object containing a customer's account number may pass in a bean dependency representing a customer name as a parameter for the bean definition, after which a constructor or setter may set the customer name.

In another embodiment, annotations may be used to implement DI. For example, a class (receiving class) that receives a bean may be accompanied with an "@Autowired" annotation, which enables the IoC framework to automatically locate and integrate beans accompanied by a "@Component" annotation into the receiving class.

Figure 3:
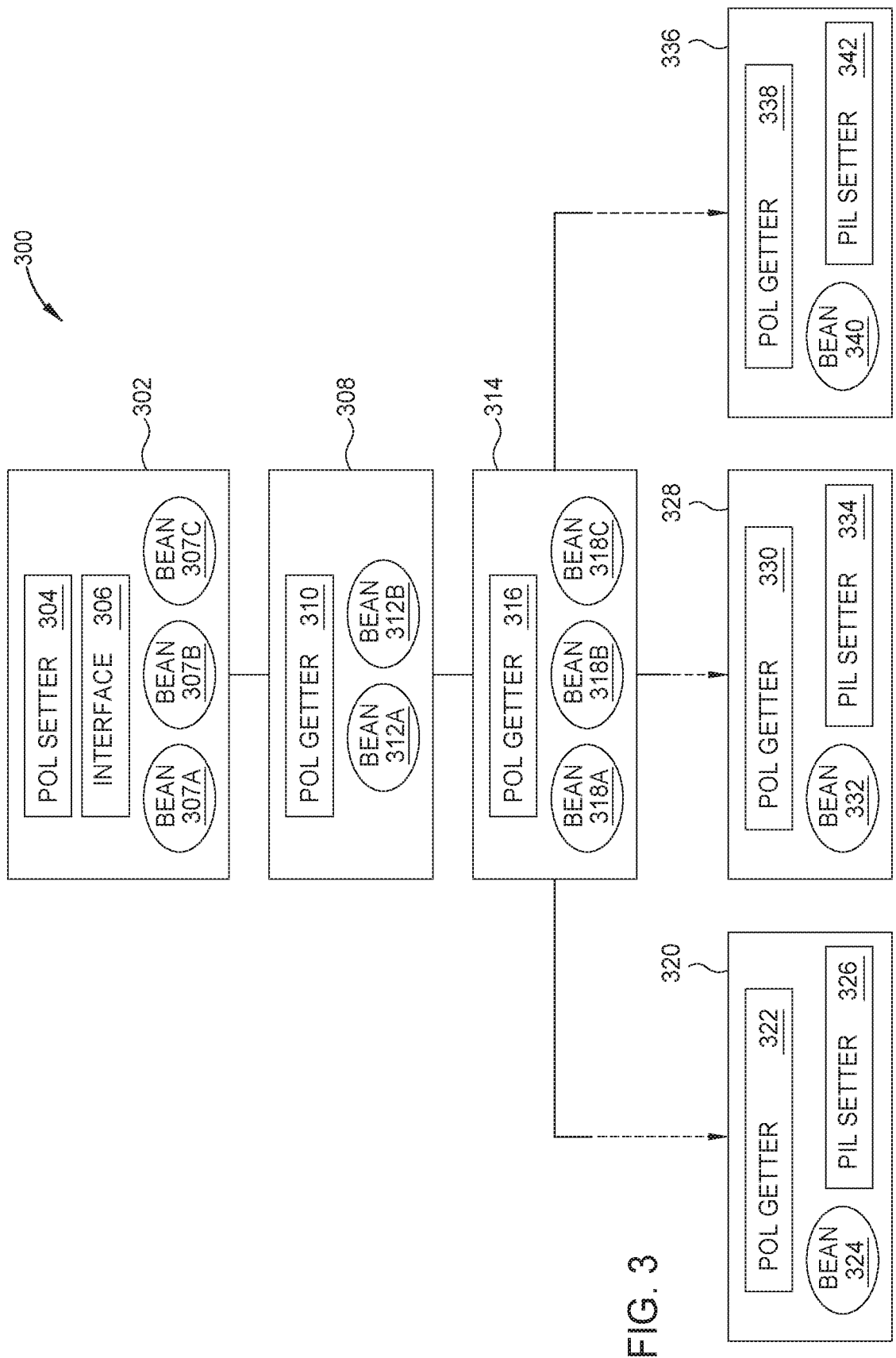
FIG. 3 illustrates downstream providers' implementation of the microservice application, according to one embodiment.

FIG. 3 illustrates downstream providers' implementation of the microservice application, according to one embodiment. In some embodiments, downstream providers can select beans for use from any POL (provider level), or construct their own bean implementation. In some embodiments, downstream providers select beans from a POL, and then modify the selected beans.

In the illustrated embodiment, a base provider develops a base code module 302 that includes a POL setter 304, an interface 306, and one or more bean implementations (e.g., bean implementation 307). The base code module 302 is made available to downstream provider 1, provider 2, provider N1, provider N2, and provider NM. For example, the base code module 302 can be stored on a database that is accessible by the aforementioned downstream providers.

The POL setter 304 is used to designate a POL that references a bean implementation created by a base provider or downstream provider. For example, the base provider can construct a bean implementation and set POL 0 as the provider level referencing the bean implementation. A downstream provider can then select POL 0, enabling the downstream provider to use the base provider's bean implementation.

The base provider can create the interface 306 defining parameters and formats for bean implementations that are compatible with the microservice application. The interface is delivered to downstream providers. Thus, by constructing a bean implementation that complies with the interface, a downstream provider is ensuring that the bean implementation is compatible with the microservice application.

A downstream provider can select a bean implementation based on a POL, or construct its own bean implementation. When a downstream provider constructs or modifies a bean implementation, the bean implementation can be delivered to a database accessible by the base provider or any downstream provider. In some embodiments, a first downstream provider constructs a bean implementation, which is delivered to an extender module stored on a server. In some embodiments, the first downstream provider selects a bean implementation based on a POL, receives the bean implementation from the extender module, and then modifies the bean implementation, which is delivered to the extender module stored the server.

The extender module can store the constructed or modified bean implementation at a POL corresponding to the first downstream provider. The extender module can also store bean implementations from multiple downstream providers at the same POL. Bean implementations stored in the extender can then be accessed by a second downstream provider, enabling the second downstream provider to use the bean implementation from the first downstream provider in lieu of constructing its own bean implementation.

In some embodiments, the base provider and downstream providers have a hierarchical flow structure. For example, the base provider could be a business services team of a corporation; a first downstream provider could be a software development team of a business partner of the corporation; a second downstream provider could be a programmer at a retail shop that is contracted to the business partner of the corporation.

Hence, in this example, the business services team of the corporation can create bean implementations that are used by the first downstream provider. The first downstream provider may construct its own bean implementation, or select a bean implementation from the corporation. The second downstream provider may construct its own bean implementation, or select a bean implementation from either the corporation or the business partner.

In another example, a downstream provider that is furthest downstream is a computer retail business. If a base provider has a bean implementation for a base hard drive, and the first downstream provider has a bean implementation for a first hard drive, the retail business may select the bean implementation for the first hard drive for use in its code module. This code module can be used as part of a microservice application running on the retail business's point of sale system. Thus, when used by a customer, the customer sees a computer with the first hard drive.

In the illustrated embodiment, a hierarchical flow structure is depicted by arrows connecting a base provider's code module 302 to a first downstream provider's code module 308, connecting the first downstream provider's code module 308 to a second downstream provider's code module 314, and connecting the second downstream provider's code module 314 to a third downstream provider's code module 320, a fourth downstream provider's code module 328, and a fifth downstream provider's code module 336.

The first downstream provider develops a code module 308 that includes a POL getter 310, bean implementation 302A, and bean implementation 302B. The POL getter 310 is used to select the base provider's POL from which a bean implementation is retrieved for use as bean implementation 302A by the first downstream provider. The first downstream provider constructs its own bean implementation for bean 302B, which is stored in a database or the like at POL 1.

For example, assuming the base provider's bean implementation is stored at or referenced by POL 0 of an extender, if the first downstream provider wants to use the base provider's bean implementation for bean implementation 302A, then the first downstream provider can select POL 0 via the POL getter 310, and develop code module 308 using the base provider's bean implementation as bean implementation 302A. The first downstream provider's bean construction (bean implementation 302B) is stored in the extender at POL 1.

In at least one embodiment, a first downstream provider selects a bean implementation from a second provider by using an "@Provider" annotation specifying the POL of the second provider. The second provider may be a base provider or another downstream provider. At runtime, a software application uses, for the second provider, the selected bean implementation corresponding to the "@Provider" annotation specified by the first provider.

In the illustrated embodiment, the second downstream provider develops a code module 314 that includes a POL getter 316, bean implementation 318A, bean implementation 318B, and bean implementation 318C. The POL getter 316 can be used to select the base provider's POL, or a downstream provider's POL, from which a bean implementation is retrieved for use as a bean implementation by the second downstream provider. The second downstream provider uses the base provider's bean implementation for bean implementation 318A, uses the first downstream provider's bean implementation for bean implementation 318B, and constructs its own bean implementation 318C.

Returning to the previous example, the second downstream provider can select POL 0 via the POV getter 316, and develop code module 314 using the base provider's bean implementation as bean implementation 318A. Similarly, the second downstream provider can select POL 1 via the POV getter 316, and develop code module 314 using the base provider's bean implementation as bean implementation 318B. The second downstream provider's bean construction (bean implementation 318C) is stored in the extender at POL 2.

In some embodiments, when no bean implementation is selected or constructed, the bean from the greatest priority POL is used by default. The greatest priority POL may be a POL with the largest number, or a POL with the furthest ascended alphabetical letter, or any ordered designation to indicate a bean implementation from a downstream provider that is furthest downstream. In some embodiments, when no bean implementation is selected or constructed, a bean implementation from the base provider is used by default.

In the illustrated embodiment, the third downstream provider develops a code module 320 that includes a POL getter 322, bean implementation 324, and priority level (PIL) setter 326. The third downstream provider constructs its own bean implementation as bean implementation 324, which is stored at POL 3.

The fourth downstream provider develops a code module 328 that includes a POL getter 330, bean implementation 332, and PIL setter 334. The fourth downstream provider constructs its own bean implementation as bean implementation 332, which is also stored at POL 3.

The fifth downstream provider develops a code module 336 that includes a POL getter 338, bean implementation 340, and PIL setter 342. The fifth downstream provider constructs its own bean implementation as bean implementation 340, which is also stored at POL 3.

When bean implementations from multiple downstream providers exists at the same POL, each of these downstream providers may set a PIL that is used to determine priority among their bean implementations at runtime. However, in some embodiments, PILs only have priority within a shared POL. That is, PILs do not have priority over POLs. A PIL may have any ordered designation to indicate priority. For instance, PILs can be numbered sequentially from highest to lowest priority.

In the illustrated embodiment, the third downstream provider uses PIL setter 326 to set the PIL of its bean implementation 324 as PIL 1; the fourth downstream provider uses PIL setter 334 to set the PIL of its bean implementation 332 as PIL 2; the fifth downstream provider uses PIL setter 342 to set the PIL of its bean implementation 340 as PIL 3.

As mentioned above, bean implementation 324, bean implementation 332, bean implementation 340 are stored at POL 3. Assuming these bean implementations are identical in name and type, attempting to implement any of the bean implementations, absent use of the PILs, may throw an error or cause the microservice application to cease execution. The PILs allow only one of these bean implementations to be used by a downstream provider, thereby preventing any such errors from occurring.

In some embodiments, PIL 1 indicates the PIL with the greatest priority. Hence, if a downstream provider selects a bean implementation at POL 3, the bean implementation 324 associated with PIL 1 is selected by default. In some embodiments, the downstream provider can specify which PIL is used to resolve a bean implementation selected from POL 3.

Figure 4:
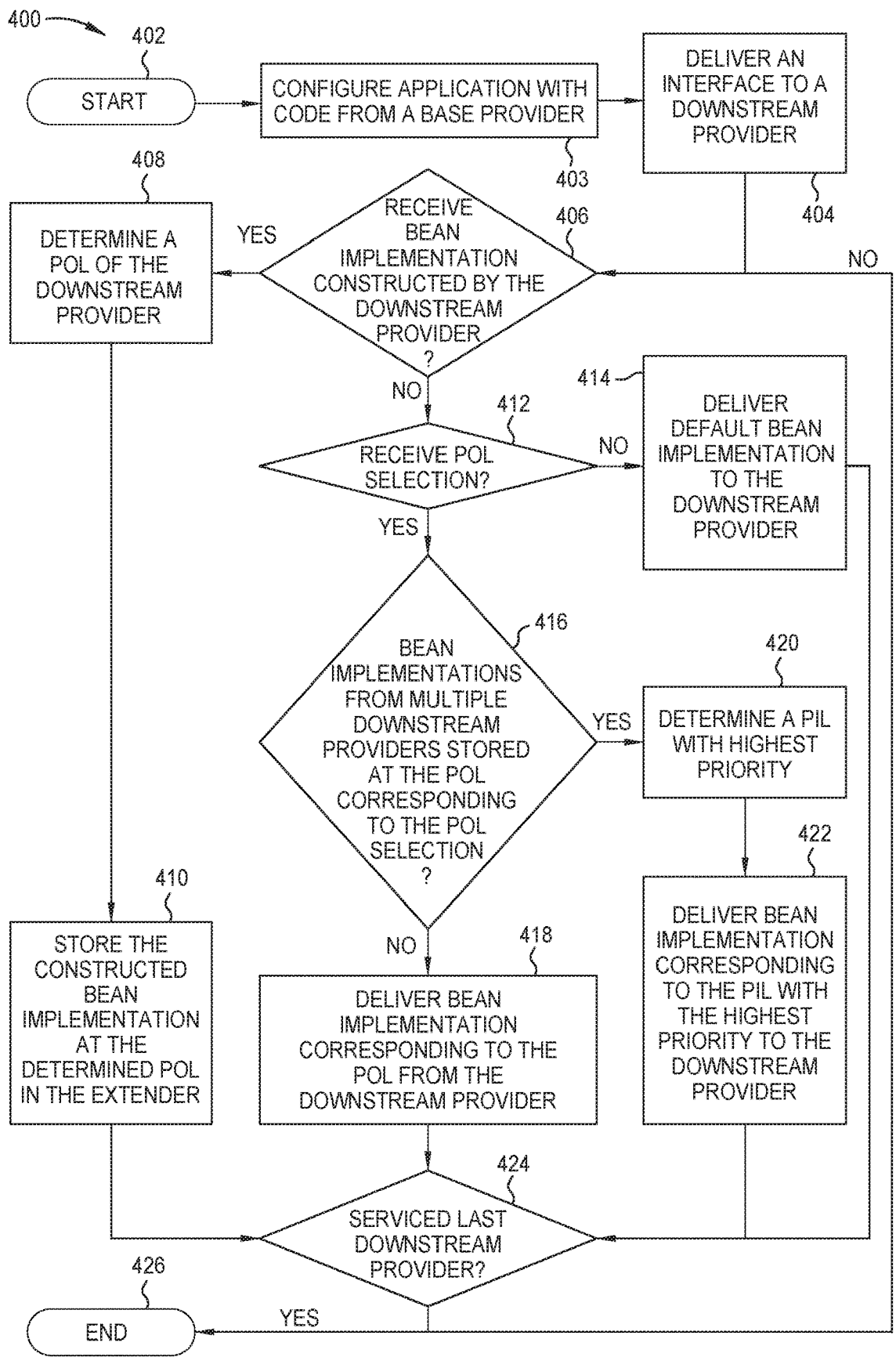
FIG. 4 illustrates a flowchart of a method for operating a software application, according to one embodiment.

FIG. 4 illustrates a flowchart of a method for operating a software application, according to one embodiment. The method 400 beings at block 402. In the illustrated embodiment, a base provider develops a software application including one or more bean implementations, an interface, and an extender.

The interface defines one or more formats or parameters for beans that are compatible with storage in the extender. Hence, by constructing a bean implementation that complies with the interface, a downstream provider can ensure that its bean implementation is compatible with the software application.

The extender allows downstream providers to extend functionality of the software application by storing bean implementations from the downstream providers at a POL. The extender can also store or reference bean implementations from the base provider at a POL. Each POL corresponds to bean implementations from one or more downstream providers. For example, bean implementations from downstream provider N can be stored in the extender at POL N. Bean implementations from another downstream provider can also be stored at POL N.

In some embodiments, the extender is a software module with a fixed amount of POLs. In some embodiments, the amount of POLs grows dynamically as the extender stores bean implementations from downstream providers. In some embodiments, the extender stores references or pointers to POLs.

In some embodiments, the extender, or the bean implementations in the extender, are made available to the base provider and downstream providers. For example, the extender can be stored in a database on the cloud.

At block 403, the software application is configured using the one or more bean implementations, the interface, and the extender from the base provider. At block 404, the interface is delivered to a downstream provider. A downstream provider may construct one or more bean implementations complying with the parameters and formats defined in the interface.

At block 406, if the software application receives a bean implementation constructed by the downstream provider, it proceeds to block 408. The bean implementation may be a newly constructed bean implementation, or may be modified from an existing bean implementation. In some embodiments, the existing bean implementation was previously constructed by another downstream provider or the base provider.

At block 408, the software application determines a POL of the downstream provider. In some embodiments, the software application determines the POL based on a POL indicator received from the downstream provider.

At block 410, the software application stores the constructed bean implementation at the determined POL in the extender. For example, if the software application determines that the downstream provider is the Nth downstream provider, then bean implementations from the downstream provider may be stored at POL N.

In some embodiments, the constructed bean implementation is stored based on an accompanying annotation that indicates the base provider or downstream provider that constructed the bean implementation. For example, an annotation such as "@Provider(ProviderLevel.Name_of_Provider)," which indicates a POL and the name of a base provider or downstream provider, can be used to determine the POL of the downstream provider. The POL or provider name may be set by the base provider, or a downstream provider.

At block 424, if the software application has serviced the last downstream provider, the software application ends the method at block 426. If the software applicant has not serviced the last downstream provider, the software application proceeds to block 406. At block 406, if the software application does not receive a bean implementation constructed by the downstream provider, it proceeds to block 412.

At block 412, if the software application receives a POL selection from the downstream provider, it proceeds to block 416. In some embodiments, the downstream provider uses an indicator to designate a POL from which the downstream provider intends to use a bean implementation. For example, an annotation such as "@Provider(ProviderLevel.Name_of_Provider)," can indicate a POL and/or the base provider or downstream provider whose bean implementation is to be used. The POL or provider name may be set by the base provider, or a downstream provider.

At block 416, if bean implementations from multiple downstream providers are not stored at the POL corresponding to the POL selection, the software application proceeds to block 418. At block 418, the software application delivers the bean implementation corresponding to the POL from the downstream provider.

At block 424, if the software application has serviced the last downstream provider, the software application ends the method at block 426. If the software applicant has not serviced the last downstream provider, the software application proceeds to block 406.

Returning to block 412, if the software application does not receive a POL selection from the downstream provider (but the downstream provider has requested a bean implementation), it proceeds to block 414. At block 414, the software application delivers a default bean implementation to the downstream provider. The base provider can set the default bean implementation.

In some embodiments, the default bean implementation is a bean implementation of the base provider. In some embodiments, the default bean implementation is a bean implementation from another downstream provider that is the furthest downstream before the downstream provider receiving the default bean implementation.

At block 424, if the software application has serviced the last downstream provider, the software application ends the method at block 426. If the software applicant has not serviced the last downstream provider, the software application proceeds to block 406.

Returning to block 416, if bean implementations from multiple providers are stored at the POL corresponding to the POL selection, the software application proceeds to block 420. As mentioned above, bean implementations from multiple downstream providers can be stored at the same POL. In some embodiments, bean implementations from multiple downstream providers being stored at the same POL occurs when multiple downstream providers exist at the same hierarchical level.

For example, the base provider could be a business services team of a corporation; a first downstream provider could be a software development team of a business partner of the corporation; a second downstream provider could be a programmer at a retail shop that is contracted to the business partner of the corporation. There may be multiple downstream providers that exists at the same hierarchical level of the second downstream provider. For instance, there may be a third and fourth downstream provider, each of which are also retail shops. If the second, third, and fourth downstream providers each construct at least one bean implementation, then the bean implementations from these three downstream providers can be stored at the same POL.

At block 420, the software application determines a PIL with the highest priority within PILs stored at the POL corresponding to the POL selection. The downstream provider can set a PIL for a bean implementation that it constructs. The software application uses the PILs to determine priority among bean implementations from multiple downstream providers at a shared POL.

PILs may have any ordered designation to indicate priority. In some embodiments, PILs are numbered sequentially from highest to lowest priority. As used herein, the highest priority for a PIL refers to a predetermined priority. In some embodiments, the PIL with the highest priority may be the PIL with the highest ranking. In some embodiments, the PIL with the highest priority may be the PIL with the lowest ranking. In some embodiments, the PIL with the highest priority may be the PIL with the median ranking.

At block 422, the software application delivers the bean implementation corresponding to the PIL with the highest priority to the downstream provider. For example, assume downstream providers 1, 2, and 3 each construct bean implementations that are stored at POL A. Downstream provider 1 set a PIL of 1 for its bean implementation; downstream provider 2 set a PIL of 2 for its bean implementation; downstream provider 3 set a PIL of 3 for its bean implementation. A further downstream provider, downstream provider 4, can select a bean implementation from POL A with a specified PIL. However, if downstream provider 4 requests a bean implementation from POL A without specifying the PIL, then the bean implementation corresponding to the PIL with the highest priority is delivered to downstream provider 4. The PIL with the highest priority is this instance may be the bean implementation with a PIL of 2, which is the bean implementation from downstream provider 2.

At block 424, if the software application has serviced the last downstream provider, the software application ends the method at block 426. If the software applicant has not serviced the last downstream provider, the software application proceeds to block 406.

Figure 5:
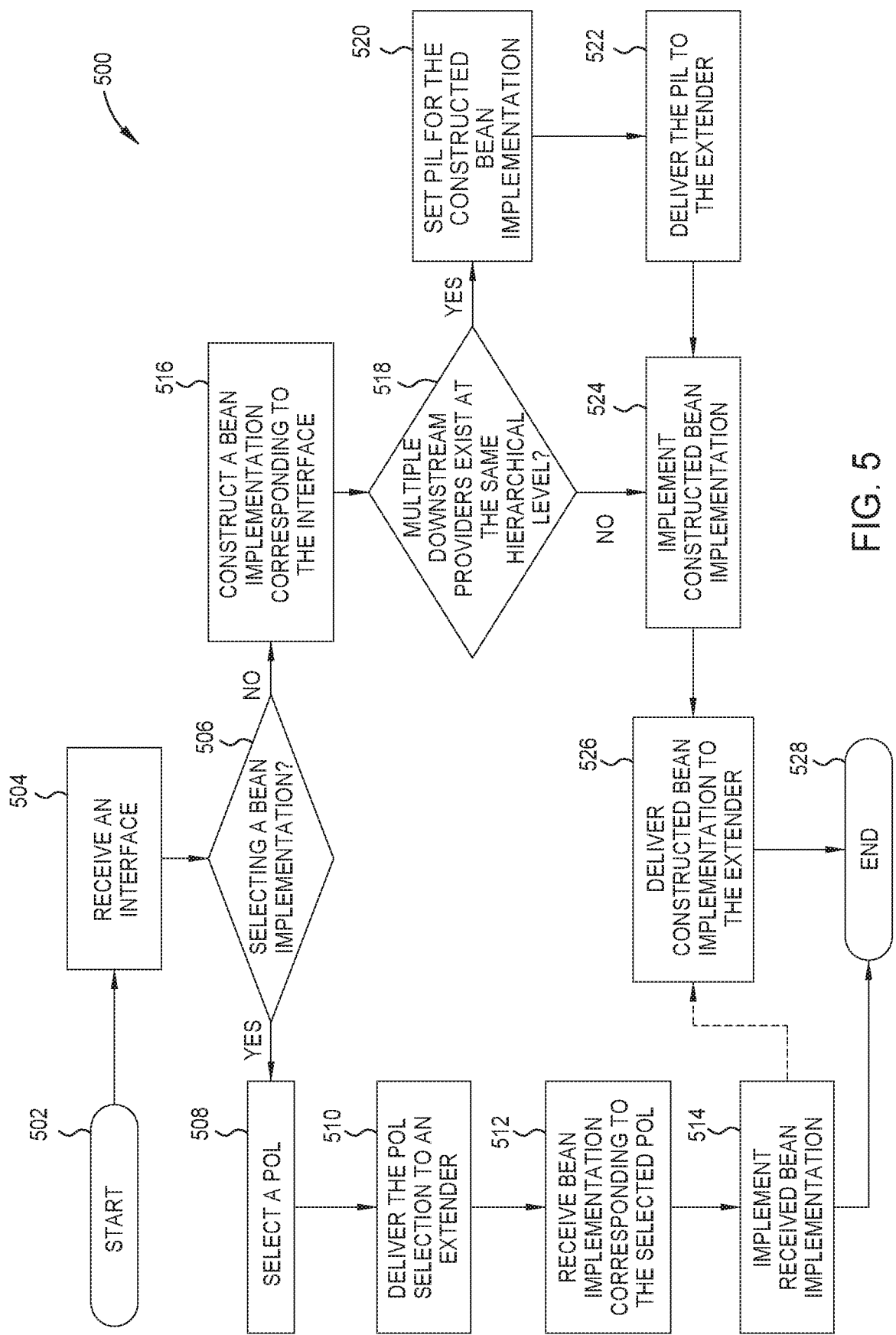
FIG. 5 illustrates a flowchart of a method for a downstream provider using a software application, according to one embodiment.

FIG. 5 illustrates a flowchart of a method for a downstream provider using a software application, according to one embodiment. The method 500 begins at block 502. At block 504, the downstream provider receives an interface, which defines one or more formats or parameters for beans that are compatible with storage in an extender.

At block 506, if the downstream provider intends to make use of a bean implementation constructed by a base provider or another downstream provider, then the downstream provider proceeds to block 508.

At block 508, the downstream provider selects a POL corresponding to a bean implementation from a base provider or another downstream provider. For example, if a downstream provider wants to use a bean implementation from the base provider instead of constructing its own implementation, the downstream provider can select a POL corresponding to the base provider.

In some embodiments, the downstream provider uses a POL Getter select the POL. In some embodiments, the downstream provider uses an annotation to select the POL. For example, the annotation can be "@Provider(ProviderLevel.Name_of_Provider)," which indicates a POL and/or the base provider or downstream provider whose bean implementation is to be used.

At block 510, the downstream provider delivers the POL selection to the extender. The software application returns to the downstream provider a bean implementation corresponding to the selected POL. At block 512, the downstream provider receives the bean implementation corresponding to the selected POL.

At block 514, the downstream provider implements the received bean implementation. In some embodiments, the downstream provider uses the bean implementation to develop a code module for the software application. In some embodiments, the bean implementation is modified for use in the code module. In some embodiments, the software application with the downstream provider's code module is run on a computer system, such as a point of sale device. At block 526, if the received bean implementation was modified, then the modified bean implementation is delivered to the extender. The method ends at block 528.

Returning to block 506, if the downstream provider does not intend to make use of a bean implementation constructed by the base provider or another downstream provider, then the downstream provider proceeds to block 516.

At block 516, the downstream provider constructs a bean implementation corresponding to the interface. At block 518, if multiple downstream providers do not exist at the same hierarchical level, the downstream provider proceeds to block 524.

At block 524, the downstream provider implements the constructed bean implementation. In some embodiments, the downstream provider uses the bean implementation to develop a code module for the software application. In some embodiments, the software application with the downstream provider's code module is run on a computer system, such as a point of sale device. At block 526, the downstream provider delivers the constructed bean implementation to the extender. The method ends at block 528.

Returning to block 518, if multiple downstream providers do exist at the same hierarchical level, the downstream provider proceeds to block 520.

As an example of hierarchical levels, the base provider could be a business services team of a corporation; a first downstream provider could be a software development team of a business partner of the corporation; a second downstream provider could be a programmer at a retail shop that is contracted to the business partner of the corporation. There may be multiple downstream providers that exists at the same hierarchical level of the second downstream provider. For instance, there may be a third and fourth downstream provider, each of which are also retail shops. If the second, third, and fourth downstream providers each construct at least one bean implementation, then the bean implementations from these three downstream providers can be stored at the same POL.

At block 520, the downstream provider sets a PIL for the constructed bean implementation. PILs may have any ordered designation to indicate priority. The ordered designation indicating priority can be defined by the base provider.

In some embodiments, PILs are numbered sequentially from highest to lowest priority. As used herein, the highest priority for a PIL refers to a predetermined priority. In some embodiments, the PIL with the highest priority may be the PIL with the highest ranking. In some embodiments, the PIL with the highest priority may be the PIL with the lowest ranking. In some embodiments, the PIL with the highest priority may be the PIL with the median ranking.

At block 522, the downstream provider delivers the PIL to the extender. At block 524, the downstream provider implements the constructed bean implementation, as described above. At block 526, the downstream provider delivers the constructed bean implementation to the extender. The method ends at block 528.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
receiving, at an extender, a plurality of bean implementations from a plurality of downstream providers, wherein the extender is a software module accessible by a base provider and the plurality of downstream providers, and wherein the extender stores the plurality of bean implementations from the base provider and the plurality of downstream providers at a plurality of provider levels (POLs);
assigning, using the extender, the plurality of bean implementations to the plurality of POLs based on which of the plurality of bean implementations from a previously assigned POL was used to develop the plurality of bean implementations, wherein the plurality of POLs form levels of a hierarchy;
receiving a POL selection from a downstream provider, wherein the POL selection corresponds to a POL of the extender, and wherein the POL selection is a POL from the plurality of POLs;
determining a priority level (PIL) for each of the plurality of bean implementations stored in the extender at the POL; and
delivering a bean implementation of the plurality of bean implementations to the downstream provider, wherein the bean implementation with a PIL corresponds to the POL selection.

2. The method of claim 1, further comprising:
identifying the plurality of bean implementations stored in the extender at the POL; and
resolving the POL to one of the plurality of bean implementations based on the determined PILs.

3. The method of claim 2, wherein the determined PILs indicate a priority among bean implementations at a shared provider level.

4. The method of claim 1, further comprising:
upon receiving a modified bean implementation from the downstream provider:
determining a POL of the downstream provider; and
storing the modified bean implementation in the extender at the determined POL.

5. The method of claim 1, further comprising:
upon determining that the downstream provider has requested a bean implementation and no constructed bean or POL selection has been received:
making a default bean implementation available to the downstream provider.

6. The method of claim 1, wherein a maximum amount of POLs that can be stored in the extender grows dynamically as the extender stores the plurality of bean implementations.

7. A computer program product comprising:
a non-transitory computer-readable storage medium having computer-readable program code embodied therewith, the computer-readable program code, executable by one or more computer processors, configured to:
receive, at an extender, a plurality of bean implementations from a plurality of downstream providers, wherein the extender is a software module accessible by a base provider and the plurality of downstream providers, and wherein the extender stores the plurality of bean implementations from the base provider and the plurality of downstream providers at a plurality of provider levels (POLs);
assign, using the extender, the plurality of bean implementations to the POLs based on which of the plurality of bean implementations from a previously assigned POL was used to develop the plurality of bean implementations, wherein the plurality of POLs form levels of a hierarchy:
receive a POL selection from a downstream provider, wherein the POL selection corresponds to a POL of the extender, and wherein the POL selection is a POL from the plurality of POLs;
determine a priority level (PIL) for each of the plurality of bean implementations stored in the extender at the POL; and
deliver a bean implementation of the plurality of bean implementations to the downstream provider, wherein the bean implementation with a PIL corresponds to the POL selection.

8. The computer program product of claim 7, the computer-readable program code further configured to:
identify plurality of bean implementations stored in the extender at the POL; and
resolve the POL to one of the plurality of bean implementations based on the determined PILs.

9. The computer program product of claim 8, wherein the determined PILs indicate a priority among bean implementations at a shared provider level.

10. The computer program product of claim 7, the computer-readable program code further comprising:
upon receiving a modified bean implementation from the downstream provider:
determine a POL of a downstream provider; and
store the modified bean implementation in the extender at the determined POL.

11. The computer program product of claim 7, the computer-readable program code further comprising:
upon determining that the downstream provider has requested a bean implementation and no constructed bean or POL selection has been received:
make a default bean implementation available to the downstream provider.

12. The computer program product of claim 7, wherein a maximum amount of POLs that can be stored in the extender grows dynamically as the extender stores the plurality of bean implementations.

13. A method comprising:
receiving an interface for bean usage in an extender;
selecting a provider level (POL) for a bean implementation from a plurality of bean implementations at a plurality of POLs corresponding to a plurality of downstream providers, wherein the plurality of POLs form levels of a hierarchy based on which of the plurality of bean implementations from a previously assigned POL was used to develop a bean implementation in a respective one of the plurality of POLs;
delivering the POL selection to the extender;
setting a priority level (PIL) corresponding to the bean implementation;
delivering the PIL to the extender;
receiving, from the extender, the bean implementation with the PIL corresponding to the POL selection, wherein the bean implementation received from the extender is constructed by a base provider or a downstream provider of the plurality of downstream providers.

14. The method of claim 13, further comprising:

upon receiving the bean implementation from the extender:
   modifying the bean implementation; and
   delivering the modified bean implementation to the extender.

15. The method of claim 13, further comprising:

implementing the bean implementation in a code module developed by a first downstream provider.

16. The method of claim 13, further comprising:

implementing the bean implementation in a code module developed by a second downstream provider.

* * * * *